United States Patent Office.

JOHN A. MOORE, OF PROVIDENCE, RHODE ISLAND.

Letters Patent No. 80,084, dated July 21, 1868.

IMPROVED ROOFING-CEMENT.

*The Schedule referred to in these Letters Patent and making part of the same.*

TO WHOM IT MAY CONCERN:

Be it known that I, JOHN A. MOORE, of the city and county of Providence, and State of Rhode Island, have invented a certain new and useful Roofing-Cement; and I do declare that the following is a true and correct enumeration of the component parts thereof and description of the proportions and mode of preparation.

The matter of proportion cannot be definitely described so as to cover all combinations capable of producing a material more or less fitted for the purpose desired; I will therefore state that from actual study, experiment, and result, a cement, composed of mineral matter in proportions substantially as herein described, has proven to be most valuable.

My composition consists of the following ingredients, viz:

Clay, mixed with plumbago and sand. Proportion to be used, fifty-five per cent.

Coal, anthracite. Proportion to be used, twenty-five per cent.

Asbestos, (iron trace.) Proportion to be used, five per cent.

Plumbago, decomposed, (iron trace.) Proportion to be used, ten per cent.

Fuller's earth, (iron trace, &c.) Proportion to be used, five per cent.

The above ingredients ground and ready for use.

The proportions are mainly as enumerated above.

An analysis of the same would show substantially as follows, viz:

Alumina, forty per cent.

Plumbago, eight per cent.

Asbestos, four per cent.

Carbon, fifteen per cent.

Silica, twenty-five per cent.

Iron, three per cent.

Lime, two per cent.

Magnesia, three per cent.

These ingredients when finely ground, as shown in sample 6, are mixed with ordinary gas-tar, or its equivalent, (see sample 7,) the same to be of a sufficient quantity to unite the whole into a plastic mass, after which is applied to roofs, &c., in an obvious manner.

Many weeks' exposure to the sun and air is requisite to harden the cement, it being meanwhile impervious to water. Owing to the gradual hardening, it never seams nor cracks. Even in its hardest condition it is sufficiently elastic to prevent its being broken by treading upon it, or by any reasonable usage.

By experiment and study I have discovered that nature affords a combination strikingly similar to that herein described. It is found more particularly in the vicinity of the anthracite-coal measures of the island and State of Rhode Island. Veins of the same have been found nearly identical with the combination as invented and herein enumerated.

I therefore claim as my own invention, and desire to secure by Letters Patent—

The manufacture of a roofing-cement, by mixing with coal-tar, or other similar substance, alumina, plumbago, asbestos, carbon, silica, iron, lime, and magnesia in the proportions substantially as described, in the manner and for the purposes specified, whether found in nature or prepared by art,

JOHN A. MOORE.

Witnesses:
WILLIAM W. RICKARD,
H. C. BEACH.